United States Patent [19]

Springer et al.

[11] Patent Number: 4,851,527
[45] Date of Patent: Jul. 25, 1989

[54] WATER-SOLUBLE TRIPHENDIOXAZINE COMPOUNDS

[75] Inventors: Hartmut Springer, Königstein; Günther Schwaiger, Frankfurt am Main; Walter Helmling, Hofheim am Taunus, all of Fed. Rep. of Germany

[73] Assignee: Hoechst Aktiengesellschaft, Frankfurt am Main, Fed. Rep. of Germany

[21] Appl. No.: 901,285

[22] Filed: Aug. 27, 1986

[30] Foreign Application Priority Data

Aug. 29, 1985 [DE] Fed. Rep. of Germany ....... 3530830

[51] Int. Cl.$^4$ ................... C07D 498/04; C09B 19/00; C09B 19/02
[52] U.S. Cl. ........................................ 544/76; 544/75; 544/77
[58] Field of Search .............................. 544/75, 76, 77

[56] References Cited

U.S. PATENT DOCUMENTS

| | | | |
|---|---|---|---|
| 4,577,015 | 3/1986 | Jager et al. | 544/76 |
| 4,591,643 | 5/1986 | Jager et al. | 544/76 |
| 4,629,788 | 12/1986 | Jäger | 544/76 |

FOREIGN PATENT DOCUMENTS

| | | |
|---|---|---|
| 0141996 | 5/1985 | European Pat. Off. |
| 3336362 | 4/1985 | Fed. Rep. of Germany. |
| 3439756 | 8/1985 | Fed. Rep. of Germany. |

*Primary Examiner*—Richard L. Raymond

[57] ABSTRACT

Water-soluble triphendioxazine compounds of the formula

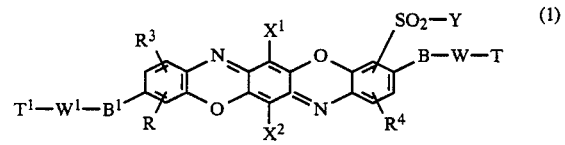

having at least one sulfato or sulfo group, in which
R is a hydrogen atom, a water-solubilizing group, an alkyl group having 1 to 6 carbon atoms which is substituted by an acidic group, or an optionally substituted sulfonamide group,
B is an oxygen or sulfur atom or a group of the formula —NH— or —N(R')—, where R' equals optionally substituted alkyl, cycloalkyl which is optionally substituted by certain substituents, or optionally substituted phenyl, or naphthyl which is optionally substituted by sulfo and/or a —SO$_2$—Y' group,
B$^1$ has one of the meanings stated for B and is identical to B or different from B,
W is a bivalent aliphatic, araliphatic or aromatic radical which may be interrupted by 1 or 2 hetero groups from the series comprising groups of the formulae —O—, —NH—and —N(R')—, where R' has the above meaning,
W$^1$ has one of the meanings stated for W and is identical to W or different from W,
T is a hydrogen atom or sulfo, sulfato, phosphato or carboxy,
T$^1$ has one of the meanings stated for T and is identical to T or different from T and T$^1$ is necessarily a water-solubilizing group when R denotes hydrogen,
R$^3$ R$^4$, identical or different, are each hydrogen, alkyl, alkoxy, halogen, carboxy or sulfo,
X$^1$ is hydrogen, halogen, cycloalkyl, arylkyloxy, alkoxy, aryloxy, alkyl, aryl, aralkyl, cyano, carboxyl, carbalkoxy, N-alkyl-substituted carbamoyl or N-aryl-substituted carbamoyl, alkanoylamino or optionally substituted aroylamino,
X$^2$ has one of the meanings stated for X$^1$ and is identical to X$^1$ or different from X$^1$,
Y is vinyl or ethyl which is substituted in the β position by a substituent which can be eliminated by means of an alkali,
Y' has one of the meanings stated for Y and is identical to Y or different from Y.

These new compounds have fiber-reactive dyestuff properties and are particularly suitable for dyeing cellulose fiber materials so that they are fast.

16 Claims, No Drawings

WATER-SOLUBLE TRIPHENDIOXAZINE COMPOUNDS

The present invention relates to the field of fiber-reactive dyestuffs.

Symmetrically-constructed, fiber-reactive triphendioxazine dyestuffs are already known from European Published Application No. 0,141,996A and also from German Published Specification No. 3,439,756A, but their dyeing behavior is not yet satisfactory.

Water-soluble triphendioxazine compounds corresponding to the general formula (1)

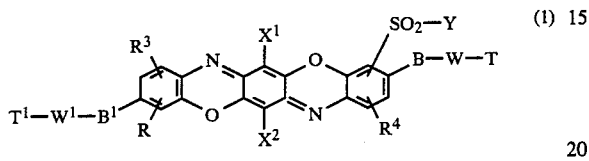

have now been found which possess valuable, improved fiber-reactive dyestuff properties.

In this formula (1):

R is a hydrogen atom or a water-solubilizing group, such as a carboxy or sulfo group, or an alkll group having 1 to 6, preferbly 1 to 4, carbon atoms which is substituted by an acidic water-solubilizing group, for example an alkyl group having 1 to 6 carbon atoms which is substituted by a sulfo, carboxy, sulfato, phosphato or sulfobenzoyloxy, sulfophenylsulfonyloxy or sulfotoluylsulfonyloxy group, or is a sulfamoyl group which can be mono- or disubstituted, the substituents preferably being alkyl groups having 1 to 4 carbon atoms which can be substituted by a phenyl radical, and phenyl radicals, these radicals themselves preferably containing water-solubilizing groups;

R is preferably a sulfo group;

B is an oxygen or sulfur atom or an amino group of the formula —NH— or —N(R')—, in which R' is an alkyl group having 1 to 8 carbon atoms, preferably having 1 to 6 carbon atoms, particularly having 1 to 4 carbon atoms, which can be substituted, or a cycloalkyl group having 5 to 8 carbon atoms, such as the cyclopentyl or cyclohexyl group, with optionally 1 to 3 methyl groups and/or an amino group, an alkanoylamino group having 2 to 5 carbon atoms or a benzoylamino group as substituents, or denotes a phenyl radical which can be substituted by 1, 2 or 3, preferably 1 or 2, substitutents from the group comprising sulfo, halogen, such as bromine and particularly chlorine, alkyl having 1 to 4 carbon atoms, such as methyl and ethyl, alkoxy having 1 to 4 carbon atoms, such as methoxy and ethoxy, nitro, a group of the formula —SO$_2$—Y' where Y' has the meaning stated below, alkylamino with an alkyl radical having 1 to 4 carbon atoms, dialkylamino with alkyl radicals having 1 to 4 carbon atoms in each case, alkanoylamino having 2 to 5 carbon atoms, such as acetylamino and benzoylamino, or is a naphthyl radical which can be substituted by 1, 2 or 3 sulfo groups and/or a group of the formula —SO$_2$—Y';

B$^1$ has one of the meanings stated for B, B$^1$ being identical to B or different from B;

W is a bivalent aliphatic, araliphatic or aromatic radical, which can be interrupted by 1 or 2 hetero groups which are selected from groups of the formula —O—, —NH— and —N(R')—, where R' has the abovementioned meaning;

W$^1$ has one of the meanings stated for W, W$^1$ being identical to W or different from W;

T is a hydrogen atom or a sulfo, sulfato, phosphato or carboxy group, preferably one of these water-solubilizing groups;

T$^1$ has one of the meanings stated for T, T$^1$ being identical to T or different from T, but T$^1$ necessarily being one of these water-solubilizing groups when R denotes a hydrogen atom; in particular, T$^1$ is a sulfo group when R does not represent a sulfo group;

R$^3$ and R$^4$ are identical to one another or different from one another and each is a hydrogen atom or an alkyl having 1 to 6 carbon atoms, preferably having 1 to 4 carbon atoms, such as, particularly among these, methyl and ethyl, an alkoxy group having 1 to 5 carbon atoms, preferably having 1 to 4 carbon atoms, such as, particularly among these, methoxy and ethoxy, a halogen, such as fluorine and bromine and, particularly, chlorine, carboxy or sulfo;

X$^1$ is a hydrogen atom or a halogen atom, such as, in particular, a chlorine or bromine atom, a cycloalkyl group, an aralkyloxy group, an alkoxy group having 1 to 4 carbon atoms, such as the methoxy group, an aryloxy group, an alkyl group having 1 to 4 carbon atoms, such as the methyl group, an aryl group, an aralkyl group, a cyano group, a carboxy group, a carbalkoxy group having 2 to 5 carbon atoms, such as the carbomethoxy or carbethoxy group, an N-alkylcarbamoyl group or N,N-dialkylcarbamoyl group with alkyl radicals having 1 to 4 carbon atoms in each case, an N-arylcarbamoyl group, an alkanoylamino group having 2 to 5 carbon atoms, such as the acetylamino group, or an aroylamino group, such as the benzoylamino group, the aryl radicals in these substituents preferably being phenyl radicals which can be further substituted by 1 or 2 substituents from the group comprising halogen, such as chlorine, nitro, alkyl having 1 to 4 carbon atoms, alkoxy having 1 to 4 carbon atoms, carboxy and sulfo, and X$^1$ preferably being a hydrogen atom, an alkanoylamino group having 2 to 5 carbon atoms, a phenoxy group which can be substituted by chlorine, an alkoxy group having 1 to 4 carbon atoms, an alkyl group having 1 to 4 carbon atoms, and, particularly preferably, a chlorine atom or bromine atom;

X$^2$ is identical to X$^1$ or different from X$^1$ and has one of the meanings stated for X$^1$;

the —SO$_2$—Y group is preferably bound in the ortho position to the —B—W—T group;

the R group is preferably bound in the ortho position to the T$^1$—W$^1$—B$^1$— group;

Y is the vinyl group or an ethyl group which contains a substituent in the β-position which can be eliminated by means of an alkali;

Y' is the vinyl group or an ethyl group which contains a substituent in the β-position which can be eliminated by means of an alkali, the Y and Y' groups having meanings which are identical to one another or different from one another;

the molecule (1) necessarily contains at least one, preferably at least two, of the sulfo and sulfato groups which can be contained in the molecule (1).

The —B—W—T and T¹—W¹—B¹— radicals can have meanings which are identical to one another or different from another.

Substituents which, according to the formula member Y or Y', are bound in the β-position of the ethyl group and which can be eliminated by an alkali with formation of the vinyl group are, for example, alkanoyloxy groups having 2 to 5 carbon atoms, such as the acetyloxy group, aroyloxy groups such as the benzoyloxy, sulfobenzolloxy or carboxybenzoyloxy group, dialkylamino groups with alkyl radicals having 1 to 4 carbon atoms, such as, particularly, the dimethylamino and diethylamino group, the chlorine atom, the bromine atom, alkylsulfonyloxy groups with alkyl radicals having 1 to 4 carbon atoms, a phosphato group, a thiosulfato group or a sulfato grup. The β-chloroethyl, β-phosphatoethyl and β-thiosulfatoethyl group are preferred, the vinyl group is particularly preferred and the β-sulfatoethyl group is very particularly preferred of the groups corresponding to the formula member Y.

The formula member Y' is preferably the β-phosphatoethyl, vinyl and β-sulfatoethyl group.

The substituted sulfonamide group, which can be the formula radical R in the general formula (1), preferably contains, as already described, water-solubilizing groups, such as, particularly, sulfo and carboxy groups. Substituted sulfonamide groups of the radical R are, for example, compounds of the general formula (2a) and (2b), among these particularly of the general formula (2a)

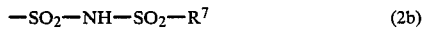

in which:
R⁵ is a hydrogen atom or an alkyl group having 1 to 6 carbon atoms, preferably having 1 to 4 carbon atoms, which can be substituted by a sulfo, carboxy or sulfato group, or is an aromatic radical, such as a naphthyl or, particularly, a phenyl radical, which has at least one sulfo group, such as 1 or 2 sulfo groups, as substituents; R⁵ is preferably a phenyl radical which is substituted by 1 or 2 sulfo groups, or is a β-sulfoethyl group;

R⁶ is a hydrogen atom or an alkyl group having 1 to 6 carbon atoms, preferably having 1 to 4 carbon atoms, which can be substituted, such as, for example, by an alkoxy group having 1 to 4 carbon atoms, such as the methoxy group, a sulfato group, a carboxy group or a sulfo group;

R⁷ is an alkyl group having 1 to 4 carbon atoms, such as, particularly, a methyl or ethyl group, which can be substituted, such as for example, by a carboxy group, a sulfo group or sulfato group, or is an optionally substituted aryl group, particularly a phenyl radical, which can be substituted, such as, for example, by 1 or 2 substituents from the group comprising alkyl having 1 to 4 carbon atoms, such as methyl or ethyl, alkoxy having 1 to 4 carbon atoms, such as methoxy or ethoxy, carboxy, sulfo and chlorine, such as, for example, particularly a phenyl radical which is substituted by 1 or 2 sulfo groups.

The radical —B—W—T or T¹—W¹—B¹— is preferably a radical of the general formula (2c)

in which:
R¹ is a hydrogen atom or an alkyl group having 1 to 8 carbon atoms, preferably having 1 to 6 carbon atoms, particularly having 1 to 4 carbon atoms, which can be substituted, 1 or 2 of these substituents preferably being water-solubilizing groups, such as sulfo, carboxy, sulfato and phosphato groups, or is a cycloalkyl group having 5 to 8 carbon atoms, such as the cyclopentyl or cyclohexyl group, with optionally 1 to 3 methyl groups and/or an amino group, an alkanoylamino group having 2 to 5 carbon atoms or a benzoylamino group as substituents, or is the phenyl radical which can be substituted by 1, 2 or 3, preferably 1 or 2, substituents from the group comprising sulfo, carboxy, halogen, such as bromine and, particularly, chlorine, alkyl having 1 to 4 carbon atoms, such as methyl and ethyl, alkoxy having 1 to 4 carbon atoms, such as methoxy and ethoxy, nitro, a group of the formula —SO₂—Y' where Y' has the above-mentioned meaning, alkylamino with an alkyl radical having 1 to 4 carbon atoms, dialkylamino with alkyl radicals having 1 to 4 carbon atoms in each case, alkanoylamino having 2 to 5 carbon atoms, such as acetylamino, and benzoylamino, or is a naphthyl radical, which can be substituted by 1, 2 or 3 sulfo groups and/or a group of formula —SO₂—Y', R² has one of the meanings stated for R¹, R² being identical to R¹ or different from R¹, or R¹ and R², together with the nitrogen atom and 1, 2 or 3 alkylene radicals having 1 to 5 carbon atoms and, if appropriate, one or two further hetero atoms, such as nitrogen, oxygen or sulfur atoms, form a 5- to 8-membered heterocyclic radical, such as, for example, the piperidino, piperazino or morpholino radical, and the two groups —NR¹R² can have meanings which are identical to one another or different from one another.

Sulfo groups are groups corresponding to the general formula —SO₃M, carboxy groups are groups corresponding to the general formula —COOM, sulfato groups are groups corresponding to the general formula —OSO₃M, thiosulfato groups are groups corresponding to the general formula —S—SO₃M and phosphato groups are groups corresponding to the general formula —OPO₃M₂, M, here and below, having the following meaning:

M is a hydrogen atom or an llkali metal, such as sodium, potassium and lithium, or the equivalent of an alkaline earth metal, such as, for example, of calcium.

The formula members W and W¹ are preferably alkylene groups having 1 to 8 carbon atoms, preferably having 1 to 6 carbon atoms, particularly having 2 to 4 carbon atoms, where this alkylene chain may be interrupted by 1 or 2 hetero groups selected from oxygen atoms and amino groups —NH— or —N(R')—, where R' has the above meaning, or alkylenephenylene radicals, phenylenealkylene radicals, phenylenealkylenephenylene radicals or alkylenephenylnne-alkylene radicals, the alkylene radicals in these araliphatic radicals having 1 to 4 carbon atoms and the benzene nuclei being optionally substituted by a further 1 or 2 substituents from the group comprising sulfo, carboxy, sulfamoyl, carbamoyl, methyl, ethyl, methoxy, ethoxy, nitro and chlorine, or are preferably phenylene radicals, particularly meta- or paraphenylene radicals, which can be substituted by a further 1 or 2 substituents from the group comprising sulfo, carboxy, sulfamoyl, carbamoyl, methyl, ethyl, methoxy, ethoxy and chlorine, but preferably by sulfo, or are preferably cycloalkylene radicals, such as cyclohexylene radicals. W or $W^1$ is preferably an alkylene radical having 2 to 4 carbon atoms or a phenylene radical, which can be substituted by 1 or 2 substituents, preferably by one substituent, from the group comprising sulfo, carboxy, methyl, methoxy, ethoxy and chlorine, or is particularly preferably an alkylene-phenylene radical, T or $T^1$ being bound to the benzene nucleus of this radical and this benzene nucleus being further optionally substituted by a sulfo group.

The alkyl groups representing R', $R^1$ and $R^2$ can be substituted, such as, for example, by 1 or 2 substituents from the series of substituents comprising halogen, such as bromine and particularly chlorine, sulfato, phosphato, sulfo, carboxy, carbaloxy having 2 to 5 carbon atoms, such as carbomethoxy and carbethoxy, alkanoylamino having 2 to 5 carbon atoms, such as acetylamino, alkylamino having 1 to 4 carbon atoms in the alkyl radical, such as methylamino and ethylamino, dialkylamino having 1 to 4 carbon atoms in the alkyl radicals, such as dimethylamino and diethylamino, an alkylamino or dialkylamino having, in each case, 1 to 4 carbon atoms in the alkyl radicals of the mono- or dialkylamine and being substituted in the alkyl radicals by a sulfo group, a carboxy group, a sulfato group or a phosphato group or an alkoxy group having 1 to 4 carbon atoms or a β-sulfatoethoxy or β-sulfato di-, tri- or tetra-glycol ether group, furthermore from a group of the formula —$SO_2$—Y' where Y' has the abovementioned meaning, from phenyl and phenyl which is substituted by substituents from the group comprising alkyl having 1 to 4 carbon atoms, alkoxy having 1 to 4 carbon atoms, halogen, such as bromine and particularly chlorine, nitro, sulfo, carboxy, a group of the formula —$SO_2$—Y" where Y' has the abovementioned meaning, amino, alkylamino with an alkyl radical having 1 to 4 carbon atoms, alkanoylamino having 2 to 5 carbon atoms, such as acetylamino, benzoylamino, sulfobenzoylamino and/or carbalkoxy having 2 to 5 carbon atoms. The benzyl and phenethyl groups are preferred phenyl-substituted alkyl groups.

R' is particularly preferably a hydrogen atom.

Of the radicals $R^1$ and $R^2$, those are particularly preferred which represent a hydrogen atom or an alkyl group having 1 to 4 carbon atoms, which can be substituted by a sulfo group, a carboxy group or a sulfato group or which is substituted by a monosulfophenyl or disulfophenyl group. $R^2$ is particuaarly preferably a β-(monosulfophenyl or disulfophenyl)ethyl group or an α-(monosulfophenyl or disulfophenyl)methyl group or a β-sulfatopropyl group or a γ-sulfatopropyl group, a β-sulfatoethyl group, a β,γ-disulfatopropyl group, a β-sulfatoisopropyl group, an α-sulfatomethylpropyl group, a β-(β'-sulfatoethoxy)ethyl group or a β-sulfoethyl group.

The radical —B—W—T is particularly preferably the β-sulfatoethyl group.

Compounds of the formula (1) in which each $R^1$ is a hydrogen atom are preferred.

Radicals of the formulae —B—W—T or $T^1$—$W^1$—$B^1$—, in which B or $B^1$ represent an oxygen or sulfur atom, are, for example, alkoxy groups having 1 to 6, preferably 1 to 4, carbon atoms, which can be substituted by a sulfo, carboxy, sulfato, monosulfophenyl or disulfophenyl group, or alkylthio groups having 1 to 6, preferably 1 to 4, carbon atoms, which can be substituted by a sulfo, carboxy, sulfato, monosulfophenyl or disulfophenyl group, or are phenoxy groups or phenylthio groups, both of which can be substituted by 1 or 2 sulfo and/or crrboxy groups. The above radicals in which B or $B^1$ represents an oxyen or sulfur atom, a methoxy, ethoxy, n-propoxy, iso-propoxy, β-sulfoethoxy, β-sulfatoethoxy, β-sulfatoiso-propoxy, β-carboxyethoxy, γ-carboxy-propoxy, mnnosulfophenoxy, disulfophenoxy, monosulfo- or disulfophenylmethoxy, methylthio, ethylthio, n-propylthio, β-sulfatoethylthio, β-sulfoethylthio or β-carboxyethylthio group are preferred.

Those compounds which correspond to the general formula (1a)

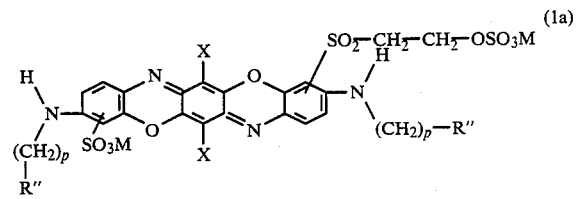

in which

X represents a bromine atom or, preferably, a chlorine atom,

M represents a hydrogen atom or, preferbbly, an alkali metal atom, such as, particularly, sodium, p represents 1, 2, 3 or 4, preferably 1, 2 or 3, and R" represents a sulfo, sulfato or β-(β'-sulfatoethoxy)ethylgroup or a monosulfophenyl or disulfophenyl group, both p and R" having, in each case, meanings which are identical to one another or different from one another, should be particularly emphasized among the triphendioxazine compounds according to the invention.

The β-sulfatoethyl, γ-sulfatopropyl, β-sulfatopropyl, β-sulfato-α-ethylethyl, β-sulfato-α-methylethyl, β-sulfatoethyl, β,γ-disulfatopropyl, p-sulfophenethyl, β-(2,4-disulfo-phenyl)ethyl, a sulfobenzyl, such as, particularly, the p-sulfobenzyl, a disulfobenzyl or the β-(β'-sulfatoethoxy)ethyl group is the preferred group of the radical —$(CH_2)_p$—R".

Those compounds which correspond to the general formula (1b)

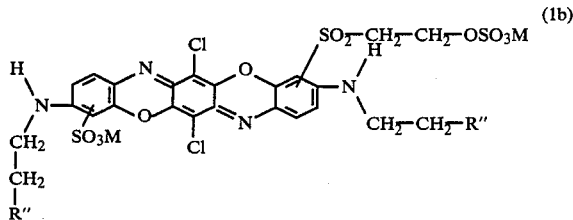
(1b)

in which M represents a hydrogen atom and preferably an alkali metal atom, such as, particularly, sodium and R" denotes a sulfo or sulfato group, should be very particularly emphasized among the triphendioxazine compounds according to the invention.

Furthermore, compounds corresponding to the general formulae (1c) and (1d)

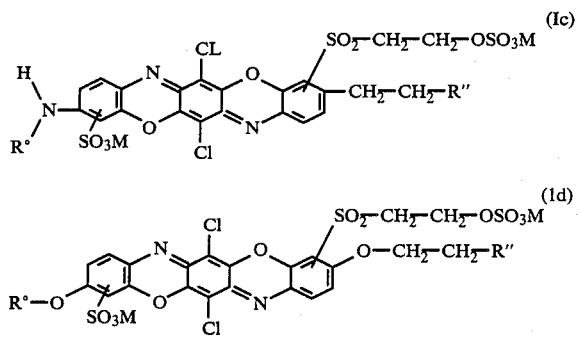

in which M and R" have the meanings mentioned for the general formula (1b) and $R^o$ denotes a hydrogen atom, an alkyl group having 1 to 4 carbon atoms or a phenyl, monosulfophenyl or monosulfobenzyl group, are particularly preferred.

The new dioxazine compounds can be present both in acidic form and in the form of their salts. They are preferably in the form of their salts, particularly the alkaline metal and alkaline earth metal salts, and are preferably used in the form o these salts for dyeing (taken here and below in the general sense and including printing) of hydroxy and/or carbonamide group-containing materials, particularly fiber materials.

The compounds according to the invention of the general formula (1) can at present not be prepared in pure form by chemical means, but they are associated with the symmetrical compounds corresponding to the general formulae (3a) and (3b)

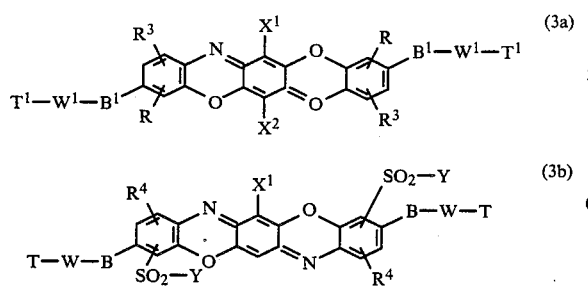

in which the individual formula members have the meanings stated for formula (1), since the compounds according to the invention are produced during the synthesis as mixtures with these symmetrical compounds of the formulae (3). These compounds of the formulae (3) do not, however, interfere with the good applicability of the compounds according to the invention of the formula (1). On the one hand, the compounds (3b) can also be fixed on the fiber as fiber-reactive dyetuffs and exhibit comparable properties to the compounds (1) according to the invention, the compounds (1) dominating, however, by means of their clearly better dyeing behavior, and being able to compensate for dyeing unevenness caused by the compounds (3b); this effect can even be present when the compounds according to the invention, of the formula (1), are present in the mixture in an amount of about 25%, relative to the substance (3b). On the other hand, although the compounds (3a) are also applied to the fiber, they do not, however, fix to the fiber, so that they can easily be washed out in the aftertreatment which occurs after the dyeing process.

The present invention thus also relates to an industrially advantageous dyestuff mixture, comprising or containing compounds corresponding to the general formulae (1), (3a) and (3b), for example in the mol-percent ratio of (19 to 50): (1 to 25):(80 to 25), preferably in the molar ratio (30 to 50):(4 to 25):(66 to 25). Advantageous dyestuff mixtures can also be obtained by addition of a compound (3b) to the mixtures which can be obtained according to the invention, the proportion of non-reactive product (3a) being displaced in favor of the fiber-reactive dyestuffs. Accordingly, advantageous dyestuff mixture are also those which contain the compounds (1) and (3b) in the molar ratio 1:4 to 1:1.

The present invention furthermore eelates to processes for the preparation of the abovementioned and defined compounds of the general formula (1). These comprise reacting an amino compound of the general formula (4) and an amino compound of the general formula (5)

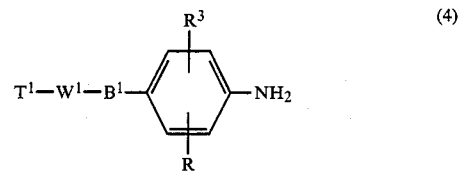

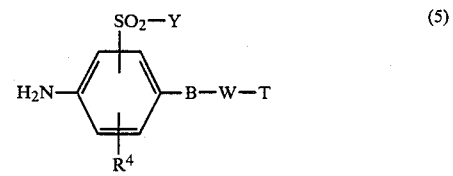

in which Y has the abovementioned meaning and is preferably the β-hydroxyethyl group, and R, $R^3$, $R^4$, B, $B^1$, W, $W^1$, T and $T^1$ have the abovementioned meanings, where substituted alkyl groups in these radicals can also be hydroxy-substituted alkyl groups, so that, for example, the radical Y' can be a β-hydroxyethyl group, and where the benzene nuclei of (4) and (5) may, under no circumstances, be substituted in one of the ortho-positions to the stated primary amino group, with a 1,4-benzoquinone compound of the general formula (6)

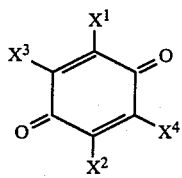

in which $X^1$ and $X^2$ have the abovementioned meanings and $X^3$ and $X^4$ are identical to one another or different from one another and each represents a hydrogen atom, an alkoxy group having 1 to 4 carbon atoms, such as, particularly, the methoxy group, or represents a phenoxy group or, preferably, is a halogen atom, such as a bromine atom and, particularly, a chlorine atom, where $X^3$ and $X^4$ may also have an identical meaning to $X^1$ and $X^2$, in a type of process which is conventional and, for the synthesis of triphendioxazine compounds, known per se, initially to form an intermediate of the presumed general formula (7)

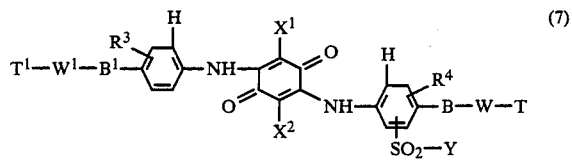

in which R, $R^3$, $R^4$, B, $B^1$, W, $W^1$, T, $T^1$, $X^1$, $X^2$ and Y have the abovementioned meanings, and cyclizing the latter, if appropriate after isolation and preferably in the presence of an oxidant, to form triphendioxazine, any hydroxyalkyl groups which may be present, such as, for example, the β-hydroxyethyl groups of the formula radical Y, being converted to the corresponding β-sulfatoalkyl or β-phosphatoalkyl groups, as appropriate before or concomitantly with the cyclization or not until after the cyclization reaction, using a sulfatizing or phosphatizing agent, such as 96–100% strength sulfuric acid or sulfur trioxide-containin sulfuric acid or polyphosphoric acid. Compounds of the formula (1) where Y or Y' is a β-sulfatoethylsulfonyl group can subsequently be converted, according to known processes, into other compounds, according to the invention, of the formula (1), in which Y or Y' represents the vinyl group or an ethyl group with another substituent in the β-position, which can be eliminated by an alkali. Of course, the two symmetrical anil compounds also occur in this reaction; these need not be discussed here or below.

The two amino compounds (4) and (5) and the quinone (6) are preferably employed in approximately equimolar amounts, the word "approximately" here meaning that the respective molar proportion can vary by up to 10%. 2,3,5,6-tetrachloro-1,4-benzoquinone (chloranil) is preferably employed as compound of the general formula (6).

The reaction, according to the invention, of two different amino compounds of the general formulae (4) and (5) with a compound of the general formula (6) to form the anil corresponding to the general formula (7) can occur in aqueous medium or in aqueous-organic medium or in pure organic medium, the organic solvents representing polar aprotic and protic solvents, such as, for example, lower alkanols, such as methanol and ethanol, and halogenated benzenes, such as o-dichlrrobenzene. The reaction, according to the invention, of the amines (4) and (5) with the quinones (6) can be carried out at a temperature between 20° and 100° C., preferably between 50° and 70° C., in the presence of an acid acceptor, such as, for example, an alkali metal carbonate or acetate or an alkaline earth metal carbonate or acetate, such as, for example, sodium acetate, sodium carbonate or sodium bicarbonate, or in the presence of an alkali metal hydroxide or alkaline earth metal hydroxide, such as sodium hydroxide, or in the presence of an alkaline earth metal oxide, such as, for example, magnesium oxide. If the reaction is carried out in an aqueous or aqueous-organic medium, the pH is adjusted to between 4 and 7, preferably between 5.5 and 6.5.

The anil of the formula (7) is then cyclized, preferably under oxidizing conditions and preferably after previous isolation, in a conventional process which is known per se, to give triphendioxazine. This reaction can occur, for example, in sulfuric acid or sulfur trioxide-containing sulfuric acid as medium; sulfur trioxide, ammonium persulfate, alkali metal persulfate, sodium borate, but preferably sodium peroxodisulfate or potassium peroxodisulfate (corresponding to the formulae $Na_2S_2O_8$ or $K_2S_2O_8$ respectively) are used as oxidant, or also oleum in the presence of iodine or of an inorganic iodine compound in analogous fashion to the details given in European Published application No. 0,141,359 A.

The reaction is preferably carried out in concentrated sulfuric acid, such as 96 to, preferably, 100% strength sulfuric acid, and particularly in sulfur trioxide-containing sulfuric acid (oleum) such as up to 30% by weight strength oleum. The reaction temperature is selected between 5° and 40° C., if appropriate also up to 80° C., but preferably between 15° and 25° C.

If the ring closure is crrried out in sulfuric acid or oleum as reaction medium, hydroxy groups which are bound to an alkyl radical ff the molecule, such as, for example, the abovementioned β-hydroxyethyl groups ff the formula radical Y or the hydroxyalkyl groups of the formula radicals $R^1$ and $R^2$, can be converted to the corresponding sulfatoalkyl groups. If oleum is used, the reaction temperature should not exceed 30° C.

According to the invention, sulfo groups can also be introduced into the aromatic rings of triphendioxazine (including the corresponding aryl radicals of $R^1$, $R^2$, $X^1$ and $X^2$) at temperatures above 25° C.

The oleum used as reaction medium and agent generally contains 5 to 30% by weight, preferably 10 to 20% by weight, of sulfur trioxide.

Known processes, leading to triphendioxazine compounds, for the reaction of aromatic amines with 1,4-benzoquinones are described, for example, in K. Venkataraman, "The Chemistry of Synthetic Dyes", volume V, p. 419–427 (1971), and in Ullmanns Encyklopä die der technischen Chemie [Ullmann's Encyclopedia of Industrial Chemistry], 4th edition, volume 8, p. 240+241 (1974), as well as in German Published Specification No. 2,823,828.

Some of the starting compounds corresponding to the general formula (5) are hitherto not yet known. Thus, compounds of the general formula (5), in which —B—W—T denotes a radical of the formula (2), can be prepared analogously to known processes for the reaction of nitrochlorobenzene with the appropriate amines, such as, for example, by reaction of a chloronitrobenzene of the general formula (8)

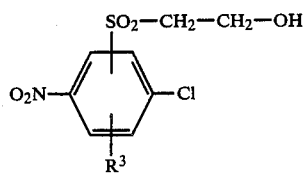

(8)

in which $R^3$ has the abovementioned meaning, with an amine of the general formula $HNR^1R^2$, where $R^1$ and $R^2$ have the abovementioned meaning, either in an excess of the amine of the formula $NHR^1R^2$ or in water or an organic medium, such as an alkanol, for example methanol, dioxane and toluene, or in a mixture of water and water-miscible organic solvents, with addition of a basic acid acceptor, such as, for example, potassium carbonate, sodium carbonate or sodium hydroxide, at a temperature between 20° and 90° C., preferably between 40° and 70° C. In aqueous medium, the pH is maintained between 6 and 10, preferably between 8 and 9. Such processes are known, for example, from processes for the preparation of p-nitrodiphenylamine-o-sulfonic acid from 2-chloro-5-nitrobenzenesulfonic acid (see, for example, Chem. Ber. 41, 3744 ff., and 42, 1077 ff.), which, in the reduced form, also serve as starting compounds for dioxazine dyestuffs.

The nitroaniline compound of the general formula (9)

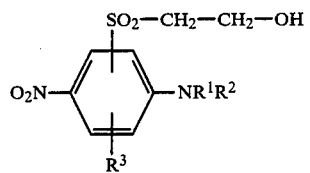

(9)

in which $R^1$, $R^2$ and $R^3$ have the abovementioned meanings and $R^3$, particularly, has the meanings mentioned for formula (5), which are obtained in this fashion, can then be reduced according to methods, conventional per se for the reduction of aromatic nitro groups using hydrogen and a metallic catalyst, such as a palladium, platinum or Raney nickel catalyst, under pressure in autoclaves, or by means of the method of Béchamp using iron turnings to form the compound correpponding to the general formula (5), in which Y represents the β-hydroxyethyl group. The fiber-reactive starting compounds corresponding to the general formula (5), in which Y represents the vinyl group or an ethyl group which contains substituents in the β position which can be eliminated using alkali, can be prepared from the 2-(β-hydroxyethylsulfonyl)-1,4-phenylenediamine compound corresponding to the general formula (5) in a generally known process involving the conversion of the β-hydroxyethylsulfonyl group into such groups. The β-hydroxyethylsulfonyl group is preferably converted into the β-sulfatoethylsulfonyl group.

Particularly advantageously, however, the preparation of the β-sulfatoethylsulfonyl compounds of the formula (1) does not start from the fiber-reactive starting compounds, as described above, but from those of the general formula (5), in which Y and/or Y' represents the β-hydroxyethyl group(s). These, together with the amine (4), in which a Y' is, if appropriate, a β-hydroxyethyl group, are reacted, in a fashion acoording to the invention, with a 1,4-benzoquinone of the general formula (6) to form the triphendioxazine via isolation of the anil intermediate, and the triphendioxazine compound produced here, with the β-hydroxyethylsulfonyl groups, is subsequently esterified (sulfatized) according to processes, conventional per se, which are described in large number for the conversion of dyestuffs having a β-hydroxyethylsulfonyl group into dyestuffs having a β-sulfatoethylsulfonyl group, for example using 95 to 100% strength sulfuric acid or using chlorosulfonic acid or using sulfur trioxide-containing sulfuric acid. In particular, the sulfatization, as described above, occurs before or during the oxidative ring closure by means of sulfuric acid or oleum, which can simultaneously serve as reaction medium, meaning that it is unnecessary to use starting compounds of the general formula (5) which already contain the β-sulfatoethylsulfonyl group.

Chloronitrobenzene compounds corresponding to the general formula (8) are known (see, for example, German Patent Specification No. 859,462, example 5). They can be synthesized by nitration of an appropriate (β-hydroxyethylsulfonyl)-chlorobenzene compound in a process conventional per se or, also in processes known per se, by reduction of an appropriate 1-chloro-4-nitrobenzene sulfochloride compound using sodium-sulfite to give the corresponding sulfinic acid, and subsequently oxethylating the sulfinic acid to give the β-hydroxyethllsulfonyl compound.

Starting compounds of the general formula (5) are, for example, 3-(β-hydroxyethylsulfonyl)aniline compounds which are substituted in the 4-position by a (β-hydroxyethyl)amino group or by a (γ-hydroxypropyl)amino, a (β-sulfatoethyl)amino, a (γ-sulfatopropyl)amino, a (β-sulfoethyl)amino, a bis(β-sulfatoethyl)amino or bis(β-sulfoethyl)amino, a β-hydroxyethoxy, β-hydroxypropoxy, β-hydroxyethylthio, γ-hydroxypropylthio, β-sulfoethoxy, β-sulfatoethoxy or a β-(β'-hydroxyethoxy)ethoxy group or by another amino group corresponding to the formula —$NR^1R^2$ stated in the tabulated examples below, and are subtituted in the 4-position preferably by a (β-hydroxyethyl)amino, (γ-hydroxypropyl)amino, (β-hydroxypropyl)amino, (β-sulfoethyl)amino, (γ-sulfopropyl)amino, β-(4-sulfophenyl)ethylamino, β-(2,4-disulfophenyl)ethylamino, β-(2-sulfo-4-β-hydroxyethylsulfonyl)ethylamino, bis(β-hydroxyethyl)amino, bis(β-sulfoethyl)amino, N-methyl-N-(β-hydroxyethyl)amino, N-ethyl-N-(β-hydroxyethyl)amino, N-methyl(β-sulfoethyl)amino or N-ethyl-N-(β-sulfoethyl)amino group, but very particularly preferably are substituted by a hydroxyalkylamino group having 1 to 4 carbon atoms, such as the (β-hydroxyethyl), (γ-hydroxypropyl)-or β-hydroxypropl)amino group.

The benzoquinones of the general formula (6) which serve as starting compounds are, for example, 2-methyl-3,5,6-tribromo-1,4-benzoquinone, 2-methoxy-3,5,6-trichloro-1,4-benzoquinone, 2,3,5,6-tetramethoxy-1,4-benzoquinone, 2,3,5,6-tetraphenoxy-1,4-benzoquinone, 2-methyl-3,6-dichloro-1,4-benzoquinone, 2,5-dichloro-1,4-benzoquinone and preferably 2,3,5,6-tetrabromo-1,4-benzoquinone and particularly 2,3,5,6-tetrachloro-1,4-benzoquinone.

The compounds of the general formula (1) which are prepared according to the invention can be precipitated and isolated from the synthesis solutions by generally known methods, thus, for example, either by precipitation of the reaction medium by means by eletrolytes, such as, for example, sodium chloride or potassium chloride, or by evaporation of the reaction solution, for example by spray-drying, it being possible to add a buffer substance to this reaction solution.

The compounds of the general formula (1) according to the invention have fiber-reactive properties and possess very good dyestuff properties. They can therefore be used for the dyeing (including printing) of hydroxy group-containing and/or carboxamido group-containing materials, for example in the form of flat structures, such as paper or leather, or in the mass, such as of polyamide or polyurethane, but in particular of such materials in the form of fibers. It is also possible to use the solutions obtained in the synthesis of the compounds according to the invention directly as a liquid preparation for dyeing, if appropriate after addition of a buffer substance and if appropriate also after concentration.

The present invention therefore also relates to the use of the compounds of the general formula (1) according to the invention for the dyeing (including printing) of hydroxy group-containing and/or carboxamido group-containing materials or to processes for their application to these substrates. The materials are preferably treated in the form of fiber materials, in particular in the form of textile fibers, such as yarns, wound packages and fabrics. Here, it is possible to proceed analogously to known processes.

Hydroxy group-containing materials are those of natural or synthetic origin, such as, for example, cellulose fiber materials or their regenerated products and polyvinyl alcohols. Cellulose fiber materials are preferably cotton, but also other vegetable fibers, such as linen, hemp, jute and ramie fibers; regenerated cellulose fibers are, for example, staple viscose rayon and filament viscose rayon.

Carboxamido group-containing materials are, for example, synthetic and natural polyamides and polyurethanes, in particular in the form of fibers, for example wool and other animal hairs, silk, leather, nylon 66, nylon 6, nylon 11 and nylon 4.

The compounds of the formula (1) according to the invention can be applied and fixed, in accordance with the use according to the invention, to the substrates mentioned, in particular to the fiber materials mentioned, using the application techniques known for water-soluble dyestuffs, in particular fiber-reactive dyestuffs, for example by applying the dioxazine compound of the general formula (1) in dissolved form onto the substrate or incorporating it into the substrate and fixing it on or in the latter, if appropriate by the action of heat and/or if appropriate by the action of an alkaline agent. Numerous such methods of dyeing and fixing are described in the literature.

Thus, they produce ver good color yields and an excellent color build-up on cellulose fibers by the exhaust methods from long liquor using a very wide variety of acid acceptors and, if appropriate, neutral salts, such as sodium chloride or sodium sulfate. Dyeing is preferably carried out in an aqueous bath at temperatures between 40° and 100° C., if appropriate at temperatures up oo 120° C. under pressure, and if appropriate in the presence of conventional dyeing auxiliaries.

A possible procedure is to introduce the material into the warm bath and to heat the latter gradually to the desired dyeing temperature and to continue the dyeing process to completion at this temperature. If desired, the neutral salts which speed up the exhaustion of the dye need not be added to the bath until the actual dyeing temperature has been reached.

Excellent color yields and a very good color build-up are also produced on cellulose fibers by means of the padding process, fixing being carried out in conventional fashion by means of dwelling at room temperature or elevated temperature, for example up to about 60° C., by steaming or by dry heat.

Strongly-colored prints with well-defined outlines and a clear white ground are likewise produced by conventional cellulose fiber printing methods, which can be carried out in one step, for example by printing with a print paste containing the compound according to the invention and sodium bicarbonate or another acid acceptor and subsequently steaming at 100° to 103° C., or in two steps, for example by printing with a neutral or weakly acid print paste containing the compound according to the invention and subsequently fixing the compound according to the inventio either by passing the printed material through a hot alkali- and electrolyte-containing bath or by overpadding using an alkaline electrolyte-containing padding liquor and subsequently dwelling this overpadded material or steaming or treating with dry heat. The quality of the prints depends on varying fixing conditions only to small extent.

Hot air at 120° to 200° C. is used for fixing by means of dry heat according to the conventional thermofixing processes. Superheated steam and high-pressure steam at temperatures up to 160° C. can also be employed in addition to customary steam at 101° to 103° C.

The degrees of fixation obtained using the dioxazine compounds according to the invention are high both in dyeing and in printing. The dyed and printed materials are obtained here with even and level shading.

The acid acceptors and those agents which effect fixation of the compound of the formula (1) to the cellulose fibers are, for example, water-soluble basic salts of alkali metals and alkaline earth metals of organic or inorganic acids, or are compounds which liberate alkali when heated. The alkali metal hydroxides and alkali metal salts of weak to medium-strength inorganic or organic acids, preferably their sodium and potassium compounds, should be mentioned in particular. Such acid acceptors are, for example, sodium hydroxide, potassium hydroxide, sodium carbonate, sodium bicarbonate, potassium carbonate, sodium formate, sodium dihydrogen phosphate, disodium hydrogen phosphate, sodium trichloroacetate, sodium silicate or trisodium phosphate.

The dyestuffs according to the invention are chemically bonded to the cellulose fibers by treating the compounds according to the invention (dyestuffs) with the acid acceptors, if appropriate with heating; the dyed cellulose materials, in particular, display excellent wet fastness properties after the conventional aftertreatment by rinsing to remove unfixed dyestuff traces, in particular since unfixed dyestuff traces can readily be washed out.

Polyurethane fibers or natural or synthetic polyamide fibers are normally dyed from an acid medium. It is thus possible to add, for example, acetic acid and/or ammonium sulfate and/or acetic acid and ammonium acetate to the dye bath in order to obtain the desired pH. It is advisable to add conventional leveling auxiliaries, such as those based, for example, on a reaction product of cyanuric chloride with three equivalents of an aminobenzene sulfonic acid and/or of an aminonaphthalenesulfonic acid or those based on a reaction product of, for example, stearylamine with ethylene oxide, in order to obtain acceptable dyeing levelness. In general, the material to be dyed is introduced into the bath at a temperature of about 40° C. and agitated therein for some time, the pH of the dye bath is then adjusted to weakly acid, as desired, preferably weakly acetic acid, such as to a pH between 3.5 and 5.5, and the actual dyeing is carried out at a temperature between 60° and 98° C., this pH being checked. However, dyeing can also be carried out at the boiling point or at temperatures up to 106° C., or also up to 120° C. (under pressure). In order to bring about full reactive bonding between the dyestuff of the formula (1) and the fiber, especially when a very deep color is desired, the pH can be adjusted into the neutral and, if appropriate, weakly alkaline range up to a pH of 8.5 towards the end of the dyeing time. The portion of the dyestuff which is not reactively bonded is dissolved off at the same time.

The dyed and printed materials prepared using the compounds of the general formula (1) according to the invention, are distinguished by pure, mainly blue, color tones. The dyed and printed cellulose fiber materials, in particular, possess very high tinctorial strengths, very good light fastness properties, including good light fastness properties when wet or wet by perspiration, good hypochlorite bleach fastness and chlorinated water fastness property, furthermore excellent wet fastness properties, such as, for example, good to very good wash fastness properties at 60° to 95° C., even in the presence of perborates, acid and alkaline fulling, cross-dyeing and perspiration fastness properties, alkali, acid, water and seawater fastness properties, and also a good pleating fastness, hot press fastness and rub fastness. They also have good wet storage properties and very good resistance to acid fading on storage of moist dyed material still containing acetic acid. Furthermore, the dyeings are stable to conventional synthetic resin finishes. Some of the compounds (dyestuffs) according to the invention are comparable to fiber-reactive anthraquinone dyestuffs regarding the purity of the color tone and regarding important fastness properties.

The use according to the invention of the compounds of the general formula (1) is also important in the fiber-reactive dyeing of wool. Felt-free or low-felt finished wool, in particular, can also be dyed with very good fastness properties (cf., for example, H. Rath, Lehrouch der Textilchemie, [Textbook of Textile Chemistry], Springer Verlag, 3rd edition (1972), p. 295–299, particularly finishing according to the so-called Hercosett process (p. 298); J. Soc. Dyers and Colourists 1972, 93–99, and 1975, 33–44).

Since the water-solubility of the compounds of the general formula (1) is very good, they can advantageously also be employed in conventional continuous dyeing processes.

The tinctorial strength of the compounds of the general formula (1) according to the invention is also very high on wool and polyamide fiber materials. They produce clear, mainly blue, dyeings on these fiber materials, particularly in the reactive dyeing of wool. Tne bath exhaustion is found to be high when dyeing temperatures of 100° to 106° C. are used.

It is possible to dispense with an otherwise conventional ammoniacal aftertreatment of the dyed materials which are obtained using the compounds of the general formula (1) according to the invention. Compared to structurally similar known dyestuffs, they surprisingly have a very good color build-up, the brilliant hue being retained in deep shades. In addition, they are highly compatible with other fiber-reactive wool dyestuffs, which permits a surprisingly level dyeing of the fiber. Similarly, material made of wool fibers of various origins can be dyed to produced level colouring with the compound according to the invention. A conventional leveling auxiliary, such as, for example, N-methyltaurine, can be added, if appropriate, to improve the leveling behavior.

The compounds according to the invention also give level dyeings on felt-free or low-felt finished wool using the conventional dyeing auxiliaries which possess affinity to the fiber. A very good wet fastness level can also be achieved without ammoniacal aftertreatment for pale to medium depths of color, but ammoniacal aftertreatment can be preferred under certain circumstances. As well as the high light fastness of these wool dyeings, the excellent alkaline perspiration fastness and very good wash fastness at 60° C., even of dyeings in very deep colors, should be mentioned as very good wet fastness properties.

The examples below serve to illustrate the invention. The parts and percentages are by weight, unless otherwise stated. Parts by weight relate to parts by volume as the kilogram relates to the liter.

The compounds described in terms of formulae in these examples are shown in the form of the free acids; they are generally prepared and isolated in the form of their sodium or potassium salts and are used for dyeing in the form of their salts. The starting compounds and components mentioned in the examples below, in particular the tabulated examples, in the form of the free acid can likewise be used in the synthesis as such or in the form of their salts, preferably alkali metal salts, such as sodium or potassium salts.

EXAMPLE 1

(a) 19 parts of 1,4-diaminobenzene-2-sulfonic acid and 26 parts of 3-($\beta$-hydroxyethylsulfonoyl)-4-($\beta$-hydroxyethylamino)aniline are dissolved in 500 parts of water at 60° C. and a pH of 6.5. 26 parts of chloranil are subsequently added at a reaction temperature of about 65° C., the pH being maintained at 6 to 6.5 by about 17 parts of sodium bicarbonate, and the reaction is then continued, with stirring, at the same temperature and the specified pH for a further 3 hours. The reaction product which precipitates is filtered off under suction at about 60° C., washed with 200 parts of water and dried under reduced pressure at 70° C.

(b) 45 parts of the intermediate obtained under (a) are introduced into 350 parts of 10% strength oleum at a temperature between 20° and 25° C. The batch is stirred for a further 3 hours at this temperature, then 36 parts of sodium peroxodisulfate are added at such a rate that the reaction temperature can be maintained at between 20° and 25° C. The mixture is stirred for a further 10 hours, the batch is then allowed to run onto ice, the pH is adjusted to between 1 and 1.5 using calcium carbonate, and then to 5.5 using sodium carbonate, the precipitated calcium sulfate is filtered off and the filtrate produced is concentrated.

An electrolyte-containing (mainly sodium chloride-containing) product with the sodium salt of the compound of the presumed formula

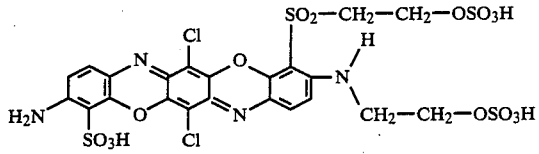

is obtained (the β-sulfatoethylsulfonyl or sulfo group can also be bonded in the other ortho position to the β-sulfatoethylamino or amino group, but is very probably in the ortho position to the dioxazine oxygen atom. The product displays an absorption maximum at 603 nm in the visible region in aqueous solution.

The compound according to the invention has very good fiber-reactive dyestuff properties. It dyes the materials mentioned in the description, particularly cellulose fiber materials, such as cotton, by the methods which are known and conventional in industry for the application and fixation of fiber-reactive dyestuffs in strongly-colored, pure reddish-blue tones with good color levelness and good fastness properties, such as, particularly, good light fastness of the dry or moist dyed material, such as moistened with drinking water, good alkali perspiration light fastness, fastness to chlorinated water, hypochlorite, bleach fastness, alkaline perspiration fastness, washing fastnsss, even in the presence of perborates, wet storage fastness and resistance to acid fading.

(c) The aniline compound employed under (a) with the β-sulfatoethylsulfonyl group can be prepared, for example, as follows: 132.8 parts of 2-(β-hydroxyethylsulfonyl)-4-nitrochlorobenzene are added slowly to a solution of 76.5 parts of ethanolamine in 500 parts by volume of methanol at a temperature of 65° C., and the reaction batch is stirred for a further 6 hours at this temperature. 400 parts by volume of methanol are subsequently distilled off from the reaction batch while simultaneously and continuously adding water. 2-(β-hydroxyethylsulfonyl)-4-nitro-1-(β-hydroxyethyl)aminobenzene crystallizes on cooling from the now aqueous medium in high purity. This compound can be employed for the conversion of the nitro group to the amino group during catalytic hydrogenation. For this, 58 parts of this nitro compound are dissolved in 400 parts by volume of methanol and hydrogenated in an autoclave in the presence of a nickel catalyst at a temperature of 100° C. and pressure of 50 bar of hydrogen. The catalyst is subsequently filtered off and the filtrate allowed to crystallize out by cooling of the methanolic solution. 3-(β-hydroxyethylsulfonyl)-4-(β-hydroxyethylamino)aniline is obtained in good yield and high purity.

EXAMPLE 1A

A dyestuff product with similarly good dyeing and fastness properties, as described in Example 1, to the triphendioxazine dyestuff of Example 1 according to the invention is obtained when the process of Example 1 is carried out, but the two starting amino compounds are employed in the following amounts:

15 parts of 1,4-diaminobenzene-2-sulfonic acid,
31 parts of 3-(β-hydroxyethylsulfonyl)-4-(β-hydroxyethylamino)aniline.

The dyestuff mixture displays an absorption maximum at 605 nm in the visible region in aqueous solution.

EXAMPLE 1B

A dyestuff product with similarly good dyeing and fastness properties, as described in Example 1, to the triphendioxazine dyestuff of Example 1 according to the invention is obtained when the process of Example 1 is carried out, but the two starting amino compounds are employed in the following amounts:

11 parts of 1,4-diaminobenzene-2-sulfonic acid,
37 parts of 3-(β-hydroxyethylsulfonyl)-4-(β-hydroxyethylamino)aniline.

The dyestuff mixture displays an absorption maximum at 607 nm in the visible region in aqueous solution.

EXAMPLE 1C

A dyestuff product with similarly good dyeing and fastness properties, as described in Example 1, to the triphendioxazine dyestuff of Example 1 according to the invention is obtained when the process of Example 1 is carried out, but the two starting amino compounds are employed in the following amounts:

8 parts of 1,4-diaminobenzene-2-sulfonic acid,
42 parts of 3-(β-hydroxyethylsulfonyl)-4-(β-hydroxyethylamino)aniline.

The dyestuff mixture displays an absorption maximum at 608 nm in the visible region in aqueous solution.

EXAMPLE 2

(a) 35 parts of 3-sulfo-4-(β-hydroxyethylamino)aniline and 39 parts of 3-(β-hydroxyethylsulfonyl)-4-(β-hydroxyethylamino)aniline are dissolved in 800 parts of water at 60° C. and pH 6.5. 37 parts of chloranil are subsequently added at a reaction temperature of about 65° C. and pH 6 to 6.5, which is maintained using about 24 parts of sodium bicarbonate. The batch is stirred for a further 3 hours at the stated reaction temperature and the stated pH, the reaction product is filtered off under suction at about 60° C., washed with water and dried.

(b) 87 parts of the intermediate obtained under (a) are introduced into 600 parts of 10% strength oleum at a temperature between 20° and 25° C.; the batch is stirred for a further 4 hours in this temperature range. 62 parts of sodium peroxodisulfate are then added while maintaining the reaction temperature at 20° to 25° C., the batch is stirred for a further 10 hours and then worked up as described in Example (1b).

An electrolyte-containing product with the sodium salt of the compound of the presumed formula

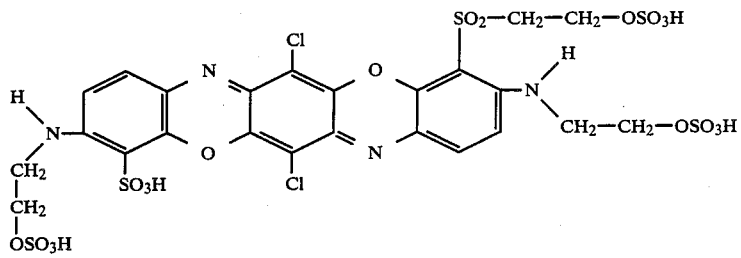

is obtained which possesses an absorption maximum at 610 nm in aqueous solution and otherwise has equally good dyeing properties to the compound according to the invention described in Example 1. The compound according to the invention produces, particularly on cellulose fiber materials according to the conventional application and fixation processes, strongly-colored, level reddish-blue dyeings and prints with good fastness properties, of which the good light fastness, alkaline perspiration fastness, fastness to chlorinated water and wet light fastness (with drinking water) can be particularly emphasized.

EXAMPLE 3

12 parts of chloranil are added to a solution, at 60° to 65° C. and pH 6, of 14 parts of 3-sulfo-4-benzylaminoaniline and 13 parts of 3-($\beta$-hydroxyethylsulfonyl)-4-($\beta$-hydroxyethylamino)aniline in 170 parts of water, the reaction temperature being maintained at about 65° C. and the pH at 6 to 6.5 (using about 8 parts of sodium bicarbonate). The mixture is subsequently stirred for a further 3 hours at 65° C. and the reaction production is filtered off under suction, washed with water and dried.

30 parts of this anil intermediate are introduced into 300 parts of 10% strength oleum at a temperature between 20° and 25° C.; the batch is stirred for a further 2 hours in this temperature range, 20 parts of sodium peroxodisulfate are gradually added while maintaining the temperature range of 20° to 25° C., the reaction batch is stirred for a further 10 hours and then worked up as described in Example (1b).

The compound according to the invention corresponding to the presumed general formula

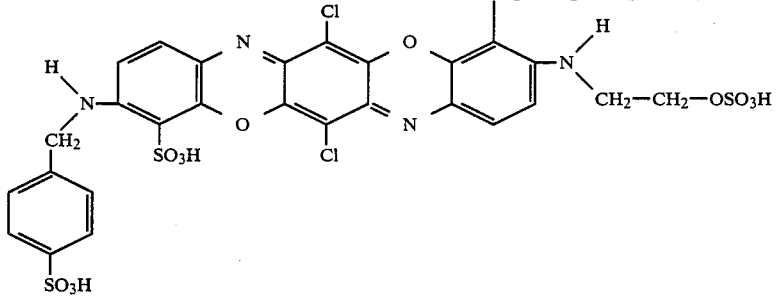

is isolated in the form of the electrolyte-containing (mainly sodium chloride-containing) sodium salt. The synthesis product possesses an absorption maximum at 608 nm in aqueous solution and produces, according to the dyeing and printing processes which are conventional in industry for fiber-reactive dyestuffs, strongly-colored, level reddish-blue dyeings and prints with good fastness properties, of which the good light fastness, alkaline perspiration light fastness and chlorinated bathing water fastness can be particularly emphasized.

EXAMPLES 4 TO 13

In the following tabulated examples, further triphendioxazine compounds according to the invention, corresponding to a general formula (A) and the corresponding formula radical $Z^1$, are described. They can be prepared in a manner according to the invention, for example analogously to the above Working Examples, by reaction of chloranil with 3-sulfo-4-benzylaminoaniline and an aniline compound corresponding to the general formula (5a) with $Z^2$ having the meaning stated in the appropriate tabulated example, and subsequently sulfating, cyclizing and sulfonating. These triphendioxazine compounds according to the invention also have very good fiber-reactive dyestuff properties and produce, on the materials mentioned in the description, such as, particularly, cellulose fiber materials, strongly-colored, fast dyeings with the color tone stated in the appropriate tabulated example on cotton.

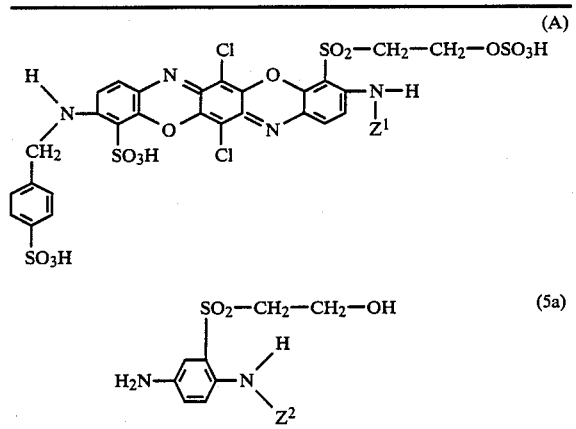

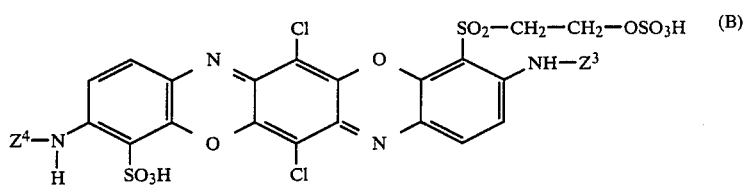

| Example | Compound of the formula (A) with $Z^1$ equal to ... | Starting amine (5a) with $Z^2$ equal to ... | Color tone |
|---|---|---|---|
| 4 | 3-sulfatopropyl | 3-hydroxypropyl | reddish blue |
| 5 | 2-sulfatopropyl | 2-hydroxypropyl | reddish blue |
| 6 | 2-sulfato-1-methylethyl | 2-hydroxy-1-methyl | reddish blue |
| 7 | 2-sulfato-1-ethylethyl | 2-hydroxy-1-ethylethyl | reddish blue |
| 8 | 2-(2'-sulfatoethoxy)ethyl | 2-(2'-hydroxyethoxy)ethyl | reddish blue |
| 9 | 2-(4'-β-sulfatoethylsulfonylphenyl)ethyl | 2-(4'-β-hydroxyethylsulfonylphenyl)ethyl | reddish blue |
| 10 | phenyl | phenyl | reddish blue |
| 11 | 2-(4'sulfophenyl)ethyl | 2-phenylethyl | reddish blue |
| 12 | 2-sulfoethyl | 2-sulfoethyl | reddish blue |
| 13 | 2,3-disulfatopropyl | 2,3-dihydroxypropyl | reddish blue |

EXAMPLE 14

The procedure for the preparation of a compound according to the invention is carried out according to the process of Example 1, but the following are employed in place of the products stated under (a):

22 parts of 3-sulfo-4-ethylaminoaniline,
26 parts of 3-(β-hydroxyethylsulfonyl)-4-(γ-hydroxypropylamino)aniline
450 parts of water,
26 parts of chloranil, and in place of the products stated under (b):

300 parts of 10% strength oleum and
20 parts of sodium peroxodisulfate.

The alkali salt, according to the invention, of the compound of the presumed formula

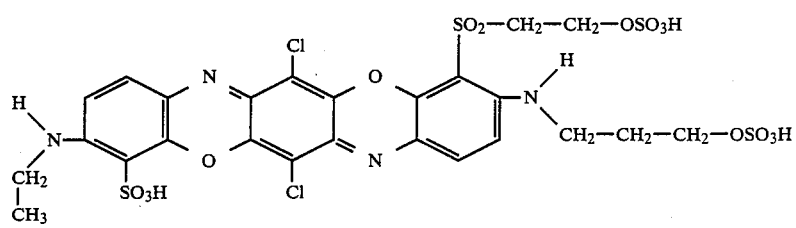

which is obtained by this procedure also has good fiber-reactive dyestuff properties and dyes cellulose fiber materials in particular in reddish-blue level tones with good fastness properties.

EXAMPLES 15 TO 45

Further triphendioxazine compounds, according to the invention, corresponding to the general formula (B)

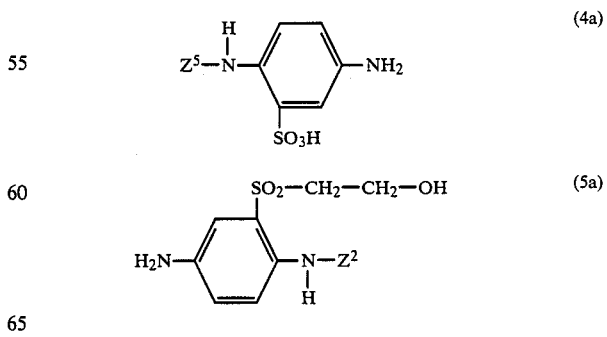

with the corresponding formula radicals $Z^3$ and $Z^4$ are described in the tabulated examples below. They can be prepared in a manner according to the invention, for example analogously to the above Working Examples, by reaction of chloranil with the aniline compounds corresponding to the general formulae (4a) and (5a)

with $Z^5$ and $Z^2$ having the meaning stated in the appropriate tabulated example, and subsequently sulfating, cyclizing and, if appropriate, sulfonating. These triphendioxazine compounds according to the invention also have very good fiber-reactive dyestuff properties and produce, on the materials mentioned in the description, such as, particularly, cellulose fiber materials, strongly-colored, fast dyeings with the color tone stated in the appropriate tabulated example on cotton.

The (electrolyte-containing) alkali metal salt, according to the invention, of the compound of the presumed formula

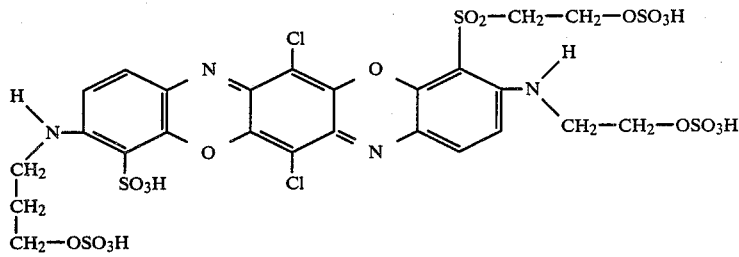

is obtained which also displays very good fiber-reactive dyestuff properties and produces, according to the conventional dyeing methods, strongly-colored and very

| Example | Compound of the formula (B) with $Z^3$ equal to ... | with $Z^4$ equal to ... | Compound (5a) with $Z^2$ equal to ... | Compound (4a) with $Z^5$ equal to ... | Color tone |
|---|---|---|---|---|---|
| 15 | 3-sulfatopropyl | hydrogen | 3-hydroxypropyl | hydrogen | reddish-blue |
| 16 | 2-sulfoethyl | hydrogen | 2-sulfoethyl | hydrogen | " |
| 17 | 4-sulfobenzyl | hydrogen | benzyl | hydrogen | " |
| 18 | 2-(4'-sulfatoethoxy)ethyl | hydrogen | 2-(4'-hydroxyethoxy)ethyl | hydrogen | " |
| 19 | 2-sulfato-1-methylethyl | hydrogen | 2-hydroxy-1-methylethyl | hydrogen | " |
| 20 | 2-sulfatopropyl | hydrogen | 2-hydroxypropyl | hydrogen | " |
| 21 | 2-sulfato-1-ethylethyl | hydrogen | 2-hydroxy-1-ethylethyl | hydrogen | " |
| 22 | 2-(4'-sulfatoethyl-sulfonylphenyl)ethyl | hydrogen | 2-(4'-hydroxyethyl-sulphonylphenyl)ethyl | hydrogen | " |
| 23 | 2-sulfato-1-methylethyl | 2-sulfatoethyl | 2-hydroxy-1-methylethyl | 2-hydroxyethyl | " |
| 24 | 2-(4'-sulfatoethyl-sulfonylphenyl)ethyl | " | 2-(4'-hydroxyethyl-sulfonylphenyl)ethyl | " | " |
| 25 | 2-(2'-sulfoethyl-amino)ethyl | " | 2-(2'-hydroxyethyl-amino)ethyl | " | " |
| 26 | 2-sulfato-1-ethylethyl | " | 2-hydroxy-1-ethylethyl | " | " |
| 27 | 2,3-disulfatopropyl | " | 2,3-dihydroxypropyl | " | " |
| 28 | 3-sulfatopropyl | " | 3-hydroxypropyl | " | " |
| 29 | 2-sulfatopropyl | " | 2-hydroxypropyl | " | " |
| 30 | 2-sulfoethyl | " | 2-sulfoethyl | " | " |
| 31 | 2-(4'-sulfophenyl)ethyl | " | 2-phenylethyl | " | " |
| 32 | 2-sulfato-1-methylethyl | propyl | 2-hydroxy-1-methylethyl | propyl | " |
| 33 | 3-sulfatopropyl | propyl | 3-hydroxypropyl | propyl | reddish-blue |
| 34 | 2-sulfatopropyl | " | 2-hydroxypropyl | " | " |
| 35 | 2-sulfatoethyl | " | 2-hydroxyethyl | " | " |
| 36 | 2-sulfoethyl | " | 2-sulfoethyl | " | " |
| 37 | 2,3-disulfatopropyl | " | 2,3-hydroxypropyl | " | " |
| 38 | 2-sulfatoethyl | methyl | 2-hydroxyethyl | methyl | " |
| 39 | 2-sulfatopropyl | methyl | 2-hydroxypropyl | methyl | " |
| 40 | 2-sulfato-1-ethylethyl | methyl | 2-hydroxy-1-ethylethyl | methyl | " |
| 41 | 2-sulfato-1-methylethyl | methyl | 2-hydroxy-1-methylethyl | methyl | " |
| 42 | 3-sulfatopropyl | methyl | 3-hydroxypropyl | methyl | " |
| 43 | 2-(2'-sulfatoethoxy)ethyl | methyl | 2-(2'-hydroxyethoxy)ethyl | methy | " |
| 44 | 4-sulfobenzyl | methyl | benzyl | methyl | " |
| 45 | 2-sulfoethyl | methyl | 2-sulfoethyl | methyl | " |

EXAMPLE 46

The procedure according to the process of Example 1 is carried out, but the following are employed in place of the components in section (a):

25 parts of 3-sulfo-4-(γ-hydroxypropylamino)aniline,
26 parts of 3-(β-hydroxyethylsulfonyl)-4-(β-hydroxyethylamino)aniline,
350 parts of water,
25 parts of chloranil, and the following in place of the components of section (b):

27 parts of the anil obtained under (a),
146 parts of 100% strength sulfuric acid,
146 parts of 20% strength oleum,
20 parts of sodium peroxodisulfate.

level dyeings in blue, fast tones. The compound according to the invention has an absorption maximum of 613 nm in aqueous solution.

EXAMPLES 47 TO 76

Further triphendioxazine compounds, according to the invention, corresponding to the abovementioned general formula (B) with the formula radicals $Z^3$ and $Z^4$ are described in the tabulated examples below. They can be prepared in a manner according to the invention, for example analogously to the Working Example 46, by reaction of chloranil with the aniline compounds corresponding to the abovementioned formulae (4a) and (5a) with $Z^2$ and $Z^5$ having the meaning stated in the appropriate tabulated example, and subsequently sulfating, cyclizing and, if appropriate, sulfonating. These triphendioxazine compounds according to the invention also have very good fiber-reactive dyestuff properties and produce, on the materials mentioned in the description, such as, particularly, cellulose fiber materials, strongly-colored, fast dyeings with the color tone stated in the appropriate tabulated example on cotton. The wavelength stated in Example 58 represents the absorption maximum, measured in aqueous solution, of the dyestuff product obtained from the synthesis.

130 parts of 10% strength oleum,
7 parts of sodium peroxodisulfate.
The sodium salt of the compound of the presumed formula

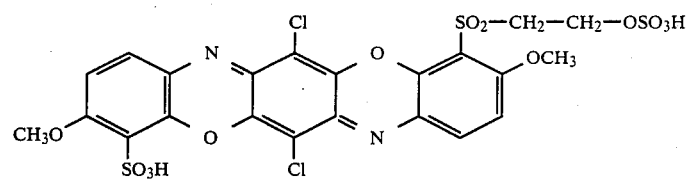

is obtained as compound according to the invention, which has an absorption maximum at 534 nm in aqueous solution and also exhibits very good fiber-reactive dyestuff properties. It produces, according to the applica-

| Example | Compound of the formula (B) with $Z^3$ equal to ... | with $Z^4$ equal to ... | Compound (5a) with $Z^2$ equal to ... | Compound (4a) with $Z^5$ equal to ... | Color tone |
|---|---|---|---|---|---|
| 47 | 2-sulfato-1-ethylethyl | 3-sulfatopropyl | 2-hydroxy-1-ethylethyl | 3-hydroxypropyl | reddish-blue |
| 48 | 2-sulfatopropyl | " | 2-hydroxypropyl | " | " |
| 49 | 3-sulfatopropyl | " | 3-hydroxypropyl | " | " |
| 50 | 2-sulfato-1-methylethyl | " | 2-hydroxy-1-methylethyl | " | " |
| 51 | 2,3-disulfatopropyl | " | 2,3-dihydroxypropyl | " | " |
| 52 | phenyl | " | phenyl | " | " |
| 53 | 2-sulfoethyl | " | 2-sulfoethyl | " | " |
| 54 | 2-(2'-sulfatoethoxy)ethyl | " | 2-(2'-hydroxyethoxy)ethyl | " | " |
| 55 | 2-(2'-sulfatoethyl-sulfonylphenyl)ethyl | " | 2-(2'-hydroxyethyl-sulfonylphenyl)ethyl | " | " |
| 56 | 2-sulfato-1-methylethyl | 2-sulfatopropyl | 2-hydroxy-1-methylethyl | 2-hydroxypropyl | " |
| 57 | 2-(2'-sulfatoethyl-amino)ethyl | " | 2-(2'-hydroxyethyl-amino)ethyl | " | " |
| 58 | 2-sulfatoethyl | " | 2-hydroxyethyl | " | reddish-blue (612 nm) |
| 59 | 2-sulfatopropyl | " | 2-hydroxypropyl | " | reddish-blue (612 nm) |
| 60 | 3-sulfatopropyl | " | 3-hydroxypropyl | " | reddish-blue (612 nm) |
| 61 | 2-(4'-sulfophenyl)ethyl | " | 2-phenylethyl | 2-hydroxypropyl | reddish-blue (612 nm) |
| 62 | 2-sulfato-1-ethylethyl | " | 2-hydroxy-1-ethylethyl | " | reddish-blue (612 nm) |
| 63 | 2-(4'-sulfatoethyl-sulfonylphenyl)ethyl | 2-sulfato-propyl | 2-(4'-hydroxyethyl-sulfonylphenyl)ethyl | 2-hydroxypropyl | reddish-blue |
| 64 | 2,3-disulfatopropyl | " | 2,3-dihydroxypropyl | " | " |
| 65 | 2-sulfoethyl | " | 2-sulfoethyl | " | " |
| 66 | phenyl | " | phenyl | " | " |
| 67 | 2-sulfatoethyl | ethyl | 2-hydroxyethyl | ethyl | " |
| 68 | 2-sulfatopropyl | " | 2-hydroxypropyl | " | " |
| 69 | 2-sulfato-1-ethylethyl | " | 2-hydroxy-1-ethylethyl | " | " |
| 70 | 2-(4'-β-sulfatoethyl-sulfonylphenyl)ethyl | " | 2-(4'-β-hydroxyethyl-sulfonylphenyl)ethyl | " | " |
| 71 | phenyl | " | phenyl | " | " |
| 72 | 4-sulfobenzyl | " | benzyl | " | " |
| 73 | 2-sulfoethyl | " | 2-sulfoethyl | " | " |
| 74 | 2-sulfato-1-methylethyl | " | 2-hydroxy-1-methylethyl | " | " |
| 75 | 2-(2'-sulfatoethyl-amino)ethyl | " | 2-(2'-hydroxyethyl-amino)ethyl | " | " |
| 76 | 2,3-disulfatopropyl | ethyl | 2,3-dihydroxypropyl | ethyl | " |

EXAMPLE 77

The procedure according to the process of Example 1 is carried out, but the following are used as reaction components in section (a):
  21 parts of 3-sulfo-4-methoxyaniline,
  23 parts of 3-(β-hydroxyethylsulfonyl)-4-methoxyaniline,
  120 parts of water,
  26 parts of choranil,
and the following are used in section (b) in place of the components stated there:
  9 parts of the anil obtained under (a), tion and fixation methods which are conventional in industry for fiber-reactive dyestuffs, bluish-red dyeings and prints with good fastness properties, of which the light fastness and alkaline perspiration light fastness can be particularly emphasized.

EXAMPLES 78 TO 80

To prepare a compound according to the invention, an analogous procedure to the process of Example 77 is carried out, but the following compounds are used in equivalent amounts in place of the two aniline compounds described for section (a):

EXAMPLE 78

3-sulfo-4-methoxyaniline,
3-(β-hydroxyethylsulfonyl)-4-(β-hydroxyethoxy)aniline;

EXAMPLE 79

3-sulfo-4-phenoxyaniline,
3-(β-hydroxyethylsulfonyl)-4-methoxyaniline;

EXAMPLE 80

3-sulfo-4-phenoxyaniline,
3-(β-hydroxyethylsulfonyl)-4-(β-hydroxyethoxy)aniline.

The compounds according to the invention are obtained in the form of their alkali metal salts; they have the following formula, written in the form of the free acid:

EXAMPLE 78

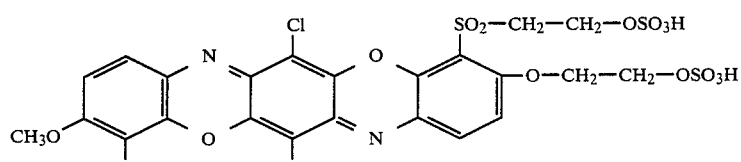

($\lambda_{max}$ of the synthesis product in aqueous solution 533 nm)

EXAMPLE 79

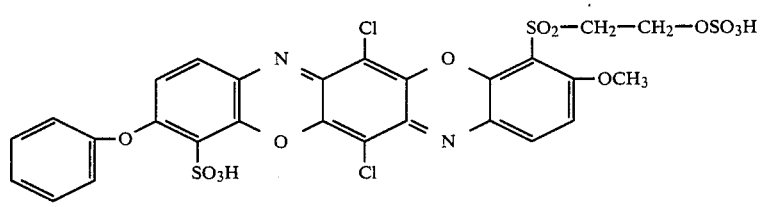

EXAMPLE 80

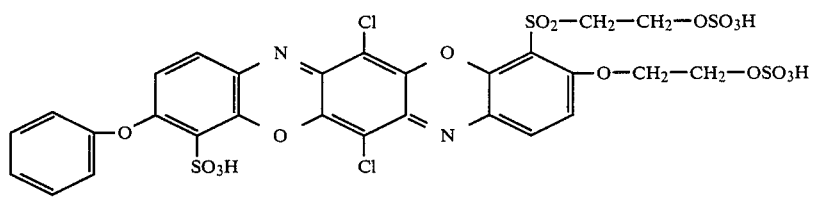

The three compounds, according to the invention, of the Examples 78 to 80 have very good fiber-reactive dyestuff properties. They dye cellulose fiber materials, such as cotton, in particular according to processes which are conventional in industry for fiber-reactive dyestuffs, in brilliant bluish-red tones with high tinctoria strength and very good levelness and also with good fastness properties, of which the good light fastness and alkaline perspiration light fastness can be particularly emphasized.

EXAMPLES 81 TO 106

Further triphendioxazine compounds, according to the invention, corresponding to the general formula (C)

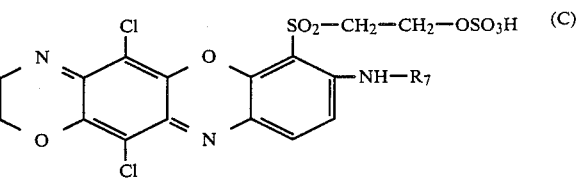

with the corresponding formula radicals $R_7$, $R_8$ and $R_9$ are described in the tabulated examples below. They can be prepared in a fashion according to the invention, for example analogously to the above Working Examples, by reaction of choranil with the aniline compounds corresponding to the general formulae (4b) and (5b)

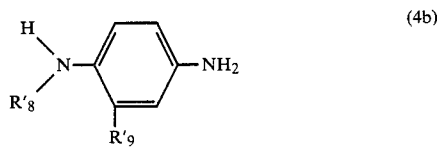

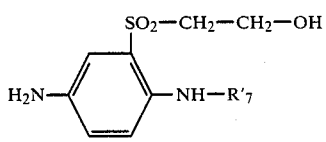

with $R'_7$, $R'_8$ and $R'_9$ having the meanings stated in the appropriate tabulated example, and subsequently sulfating, cyclizing and, if appropriate, sulfonating. These triphendioxazine compounds according to the invention also have very good fiber-reactive dyestuff properties and produce, on the materials mentioned in the description, such as, particularly, cellulose fiber materials, strongly-colored, fast dyeings with the color tone stated in the appropriate tabulated example on cotton. The wavelengths stated in the tabulated examples are absorption maxima, measured in aqueous solution of the dyestuff products obtained from the synthesis.

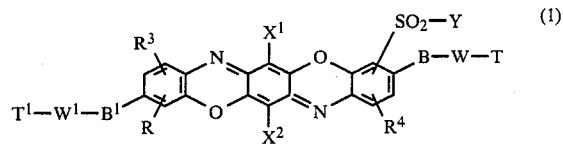

in which
R is hydrogen, carboxy or sulfo, or is alkyl of 1 to 6 carbon atoms substituted by an acidic group, or is a sulfonamide group of the general formula (2a) or

| Example | Compound (C) with $R_7$ equal to ... | $R_8$ equal to ... | $R_9$ equal to ... | From the starting compounds (4b) and (5b) with $R'_7$ equal to ... | $R'_8$ equal to ... | $R'_9$ equal to ... | Color tone |
|---|---|---|---|---|---|---|---|
| 81 | β-sulfatoethyl | phenyl | sulfo | β-hydroxyethyl | phenyl | sulfo | reddish-blue (609 nm) |
| 82 | 2-sulfato-1-ethylethyl | phenyl | sulfo | 2-hydroxy-1-ethylethyl | phenyl | sulfo | reddish-blue (609 nm) |
| 83 | 2-(2'-sulfatoethylsulfonyl-phenyl)-ethyl | " | sulfo | 2-(2'-hydroxyethylsulfonyl-phenyl)ethyl | phenyl | sulfo | reddish-blue (609 nm) |
| 84 | 3-sulfato-propyl | " | sulfo | 3-hydroxypropyl | phenyl | sulfo | reddish-blue (609 nm) |
| 85 | 2-sulfato-1-methylethyl | " | sulfo | 2-hydroxy-1-methylethyl | phenyl | sulfo | reddish-blue (609 nm) |
| 86 | 2-sulfato-propyl | " | sulfo | 2-hydroxypropyl | phenyl | sulfo | reddish-blue (609 nm) |
| 87 | 2-sulfoethyl | " | sulfo | 2-sulfoethyl | phenyl | sulfo | reddish-blue (609 nm) |
| 88 | 2-(4'-sulfo-phenyl)ethyl | " | sulfo | 2-phenylethyl | phenyl | sulfo | reddish-blue (609 nm) |
| 89 | 2-sulfato-ethyl | 2-sulfoethyl | (β-sulfoethyl)-sulfamoyl | 2-hydroxyethyl | 2-sulfoethyl | (β-sulfoethyl)-sulfamoyl | reddish-blue (609 nm) |
| 90 | 2-sulfato-propyl | " | (β-sulfoethyl)-sulfamoyl | 2-hydroxypropyl | " | (β-sulfoethyl)-sulfamoyl | reddish-blue (609 nm) |
| 91 | 2-sulfato-1-ethylethyl | " | (β-sulfoethyl)-sulfamoyl | 2-hydroxy-1-ethylethyl | " | (β-sulfoethyl)-sulfamoyl | reddish-blue (609 nm) |
| 92 | 4-benzyl | 2-sulfoethyl | (β-sulfoethyl)sulfamoyl | benzyl | 2-sulfoethyl | (β-sulfoethyl)-sulfamoyl | reddish-blue |
| 93 | 2-sulfoethyl | 2-sulfoethyl | (β-sulfoethyl)-sulfamoyl | 2-sulfoethyl | 2-sulfoethyl | (β-sulfoethyl)-sulfamoyl | " |
| 94 | 2-(2'-sulfato-ethoxy)ethyl | " | (β-sulfoethyl)-sulfamoyl | 2-(2'-hydroxy-ethoxy)ethyl | " | (β-sulfoethyl)-sulfamoyl | " |
| 95 | 3-sulfato-propyl | " | (β-sulfoethyl)-sulfamoyl | 3-hydroxypropyl | " | (β-sulfoethyl)-sulfamoyl | " |
| 96 | 2-sulfato-propyl | 2-(4'-sulfo-phenyl)ethyl | sulfo | 2-hydroxypropyl | 2-phenylethyl | sulfo | " |
| 97 | 3-sulfato-propyl | 2-(4'-sulfo-phenyl)ethyl | " | 3-hydroxypropyl | " | " | " |
| 98 | 2-(2'-sulfato-ethoxy)ethyl | 2-(4'-sulfo-phenyl)ethyl | " | 2-(2'-hydroxy-ethoxy)ethyl | " | " | " |
| 99 | 2-sulfoethyl | 2-(4'-sulfo-phenyl)ethyl | " | 2-sulfoethyl | " | " | " |
| 100 | Phenyl | 2-(4'-sulfo-phenyl)ethyl | " | phenyl | " | " | " |
| 101 | 2-sulfato-1-methylethyl | 2-(4'-sulfo-phenyl)ethyl | " | 2-hydroxy-1-methylethyl | " | " | " |
| 102 | 2-sulfatoethyl | 2-(4'-sulfo-phenyl)ethyl | " | 2-hydroxyethyl 2-hydroxyethyl | " | " | reddish-blue (610 nm) |
| 103 | 2-sulfatoethyl | 2-sulfoethyl | " | " | 2-sulfoethyl | sulfo | reddish-blue (610 nm) |
| 104 | 3-sulfato-propyl | " | " | 3-hydroxypropyl | " | sulfo | reddish-blue (610 nm) |
| 105 | 2-sulfoethyl | " | " | 2-sulfoethyl | " | sulfo | reddish-blue (610 nm) |
| 106 | 2-sulfato-propyl | " | " | 2-sulfopropyl | " | sulfo | reddish-blue (610 nm) |

(2b)

I claim:
1. A water-soluble triphendioxazine compound corresponding to the general formula (1)

-continued $$-SO_2-NH-SO_2-R^7 \quad (2b)$$

in which
- $R^5$ is hydrogen or alkyl of 1 to 6 carbon atoms unsubstituted or substituted by sulfo, carboxy or sulfato, or a naphthyl or phenyl both substituted by one or two sulfo groups,
- $R^6$ is hydrogen or alkyl of 1 to 4 carbon atoms unsubstituted or substituted by alkoxy of 1 to 4 carbon atoms, sulfato, carboxy or sulfo, and
- $R^7$ is alkyl of 1 to 4 carbon atoms unsubstituted or substituted by carboxy, sulfo or sulfato, or is phenyl unsubstituted or substituted by one or two substituents selected from alkyl of 1 to 4 carbon atoms, alkoxy of 1 to 4 carbon atoms, carboxy, sulfo and chlorine;
- B is an oxygen or sulfur atom or an amino group of the formula —NH— or —N(R')— in which
- R' is alkyl of 1 to 8 carbon atoms unsubstituted or substituted by 1 or 2 substituents selected from the group of substituents comprising: halogen; sulfato; phosphato; sulfo; carboxy; carbalkoxy of 2 to 5 carbon atoms; alkanoylamino of 2 to 5 carbon atoms; alkylamino of 1 to 4 carbon atoms; dialkylamino of 1 to 4 carbon atoms in each alkyl; alkylamino or dialkylamino with, in each case, alkyl moieties of 1 to 4 carbon atoms substituted by a sulfo, carboxy, sulfato, phosphato, alkoxy of 1 to 4 carbon atoms, β-sulfatoethoxy or β-sulfato-di- or -tri- or -tetraglycolether group; a group of the formula —SO₂—Y' in which Y' is defined as below; phenyl and phenyl substituted by substituents selected form the group comprising alkyl of 1 to 4 carbon atoms, alkoxy of 1 to 4 carbon atoms, halogen, nitro, sulfo, carboxy, a group of the formula —SO₂—Y' with Y' having the meaning given below, amino, alkylamino of 1 to 4 carbon atoms, alkanoylamino of 2 to 5 carbon atoms, benzoylamino, sulfobenzoylamino and carbalkoxy of 2 to 5 carbon atoms, or R' is cycloalkyl of 5 to 8 carbon atoms unsubstituted or substituted by 1 to 3 methyl groups or by an amino group or an alkanoylamino group of 2 to 5 carbon atoms or a benzoylamino group, or by 1 to 3 methyl groups and an amino group or an alkanoylamino group of 2 to 5 carbon atoms or a benzoylamino group, or
- R' is phenyl unsubstituted or substituted by one, two or three substituents selected from the group comprising sulfo, halogen, alkyl of 1 to 4 carbon atoms, alkoxy of 1 to 4 carbon atoms, nitro, a group of the formula —SO₂—Y' in which Y' has the meaning given below, alkylamino of 1 to 4 carbon atoms, dialkylamino of 1 to 4 carbon atoms in each alkyl moiety, alkanoylamino of 2 to 5 carbon atoms and benzoylamino, or R' is naphthyl unsubstituted or substituted by one, two or three sulfo groups or by a group of the formula —SO₂—Y' with Y' having the meaning given below, or substituted by one, two or three sulfo groups and a group of said formula —SO₂—Y';
- $B^1$ has one of the meanings given for B, and $B^1$ can be identical with or different from B,
- W is alkylene of 1 to 8 carbon atoms, and the alkylene chain may be interrupted by one or two hetero groups selected from oxygen, atoms and amino groups —NH— or —N(R')— in which R' has one of the above-mentioned meanings, or W is an alkylene-phenylene or phenylene-alkylene phenylene-alkylene or phenylene-alkylene-phenylene or alkylene-phenylene-alkylene radical, the alkylene radicals having 1 to 4 carbon atoms and the phenylene radicals are unsubstituted or substituted by one or two substituents selected from the group comprising sulfo, carboxy, sulfamoyl, carbamoyl, methyl, ethyl, methoxy, ethoxy, nitro and chlorine, or W is phenylene unsubstituted or substituted by one or two substituents selected from the group comprising sulfo, carboxy, sulfamoyl, carbamoyl, methyl, ethyl, methoxy, ethoxy and chlorine, or W is cyclohexylene;
- $W^1$ has one of the meanings given above for W, and $W^1$ is identical to or different from W;
- T is hydrogen, sulfo, sulfato, phosphato or carboxy;
- $T^1$ has one of the meanings given above for T, and $T^1$ is identical to or different from T, but representing necessarily one of said water-solubilizing groups if R is hydrogen;
- or the groups —B—W—T or $T^1$—$W^1$—$B^1$— or both, identical to one another or different from one another, represent each a group of the formula

in which $R^1$ and $R^2$ are both hydrogen or in which $R^1$ and $R^2$ together with the nitrogen atom and one, two or three alkylene groups of 1 to 5 carbon atoms, and with or without one or two further hetero atoms selected from nitrogen, oxygen and sulfur, form a 5- to 8-membered heterocyclic radical;
- $R^3$ and $R^4$ are identical to one another or different from one another and each is hydrogen, alkyl of 1 to 6 carbon atoms, alkoxy of 1 to 5 carbon atoms, halogen, carboxy or sulfo;
- $X^1$ is hydrogen, halogen, cycloalkyl, aralkyloxy, alkoxy of 1 to 4 carbon atoms, aryloxy, alkyl of 1 to 4 carbon atoms, aryl, aralkyl, cyano, carboxy, carbalkoxy of 2 to 5 carbon atoms, N-alkyl-carbamoyl with an alkyl of 1 to 4 carbon atoms, N,N-dialkyl-carbamoyl with alkyls each having 1 to 4 carbon atoms, N-aryl-carbamoyl, alkanoylamino of 2 to 5 carbon atoms and aroylamino, the aryl radicals in each of these substituents being unsubstituted or substituted by one or two substituents selected from the group consisting of halogen, nitro, alkyl of 1 to 4 carbon atoms, alkoxy of 1 to 4 carbon atoms, carboxy and sulfo;
- $X^2$ is identical to $X^1$ or different from $X^1$ and has one of the meanings given for $X^1$;
- Y is vinyl or is an ethyl group which is substituted in the β-position by a substituent which is eliminated by means of an alkali;
- Y' is vinyl or is an ethyl group which is substituted in the β-position by a substituent which is eliminated by means of an alkali;
- the molecule (1) necessarily contains at least one of the sulfo and sulfato groups which are mentioned for the molecule (1).

2. A compound as claimed in claim 1, in which $X^1$ and $X^2$ are both hydrogen, alkanoylamino of 2 to 5 carbon atoms, phenoxy unsubstituted of substituted by chlorine, or are alkoxy of 1 to 4 carbon atoms, alkyl of 1 to 4 carbon atoms, chlorine or bromine.

3. A compound as claimed in claim 1, in which $X^1$ and $X^2$ both are chlorine or bromine.

4. A compound as claimed in claim 1, in which the groups —B—W—T and $T^1$—$W^1$—$B^1$— or both, identical to one another or different from one another, represent each an amino group of the formula

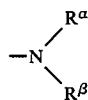

in which
$R^\alpha$ is hydrogen or is a group R' as defined in claim 1, and
$R^\beta$ is hydrogen or is alkyl of 1 to 8 carbon atoms unsubstituted or substituted by 1 or 2 substituents selected from a group of substituents consisting of: halogen; sulfato; phosphato; sulfo; carboxy; carbalkoxy of 2 to 5 carbon atoms; alkanoylamino of 2 to 5 carbon atoms; alkylamino having 1 to 4 carbon atoms in the alkyl; dialkylamino having 1 to 4 carbon atoms in each alkyl; alkylamino of 1 to 4 carbon atoms which is substituted in the alkyl by a sulfo, carboxy, sulfato, phosphato, alkoxy of 1 to 4 carbon atoms or β-sulfatoethoxy or a β-sulfato-dio-, -tri- or -tetraglycol ether group; dialkylamino having 1 to 4 carbon atoms in each of the alkyls and which alkyls are substituted by a sulfo, carboxy, sulfato, phosphato, alkoxy of 1 to 4 carbon atoms or β-sulfatoethoxy or a β-sulfato-di-, -tri- or -tetraglycol ether group; a group of the formula —$SO_2$—Y' where Y' has the meaning stated in claim 1; phenyl; and phenyl substituted by at least one substituent selected from the group consisting of alkyl of 1 to 4 carbon atoms, alkoxy of 1 to 4 carbon atoms, halogen, nitro, sulfo, carboxy, a group of the formula —$SO_2$—Y' where Y' is defined as above, amino, alkylamino with an alkyl of 1 to 4 carbon atoms, alkanoylamino of 2 to 5 carbon atoms, benzoylamino, sulfobenzoylamino and carbalkoxy of 2 to 5 carbon atoms; or $R^\beta$ is cycloalkyl of 5 to 8 carbon atoms unsubstituted or substituted by 1, 2 or 3 methyl groups or by an amino group, an alkanoylamino group having 2 to 5 carbon atoms or a benzoylamino group, or by 1, 2 or 3 methyl groups and an amino group, an alkanoylamino group having 2 to 5 carbon atoms or a benzoylamino group, or $R^\beta$ is phenyl unsubstituted or substituted by 1, 2 or 3 substituents selected from the group consisting of sulfo, halogen, alkyl having 1 to 4 carbon atoms, alkoxy having 1 to 4 carbon atoms, nitro, a group of the formula —$SO_2$—Y' where Y' is defined as above, alkylamino with an alkyl of 1 to 4 carbon aooms, dialkylamino with alkyls each of 1 to 4 carbon atoms, alkanoylamino of 2 to 5 carbon atoms and benzoylamino, or $R^\beta$ is naphthyl unsubstituted or substituted by 1, 2 or 3 sulfo groups or by a group —$SO_2$—Y' or by those sulfo and —$SO_2$—Y' groups,
$R^\alpha$ and $R^\beta$ being identical to each other to different from one another.

5. A compound as claimed in claim 1, in which W and $W^1$, identical to one another or different from one another, are each an alkylene of 1 to 8 carbon atoms or an alkylene of 2 to 8 C-atoms interrupted by one or two hetero groups selected from oxygen atoms and amino groups of the formulae —NH— or —N(R')—, where R' has the meaning mentioned in claim 1, or are alkylenephenylene, phenylene-alkylene, phenylene-alkylene-phenylene or alkylene-phenylene-alkylene where the alkylene radicals in these araliphatic radicals are those having 1 to 4 carbon atoms and the phenylenes are unsubstituted or substituted by 1 or 2 substituents selected from the group consisting of sulfo, carboxy, sulfamoyl, carbamoyl, methyl, ethyl, methoxy, ethoxy, nitro and chlorine, or is phenylene unsubstituted or substituted by 1 or 2 substituents selected from the group consisting of sulfo, carboxy, sulfamoyl, carbamoyl, methyl, ethyl methoxy, ethoxy and chlorine, or is cyclohexylene.

6. A compound as claimed in claim 1, in which W or $W^1$ is alkylene of 2 to 4 carbon atoms or phenylene unsubstituted or substituted by 1 or 2 substituents selected from the group consisting of sulfo, carboxy, methyl, methoxy, ethoxy and chlorine, or is an alkylene-phenylene radical where T or $T^1$ is bonded to its benzene ring and this benzene ring is unsubstituted or substituted by a sulfo.

7. A compound according to claim 1 in which $X^1$ and $X^2$ are both chlorine.

8. A compound as claimed in claim 1 of the general formula

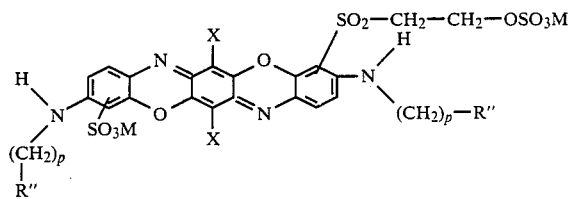

in which X is bromine or chlorine, M is hydrogen or an alkalimetal, p is 1, 2, 3 or 4 and R" is sulfo, sulfato, β-(β'-sulfatoethoxy)-ethyl, monosulfophenyl or disulfophenyl, both p and both R" may have meanings which are identical to one another or different from one another.

9. A compound according to claim 8, in which both X are chlorine.

10. A compound as claimed in claim 1 of the general formula

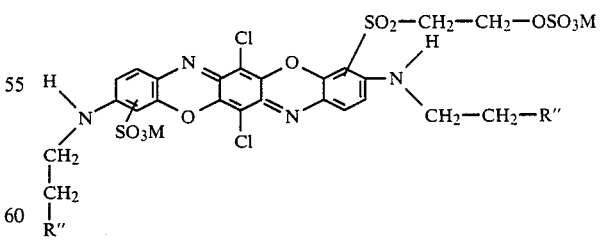

in which M is hydrogen or an alkali metal and R" is sulfo or sulfato.

11. A compound as claimed in claim 1, in which Y and Y' each are β-sulfatoethyl.

12. A compound as claimed in claim 1 of the general formula

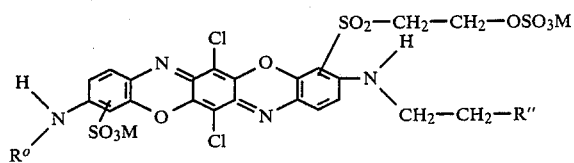

in which M is hydrogen or an alkali metal, R'' is sulfo or sulfato, and $R^o$ is hydrogen, alkyl or 1 to 4 carbon atoms, monosulfophenyl or monosulfobenzyl.

13. A compound as claimed in claim 1 of the general formula

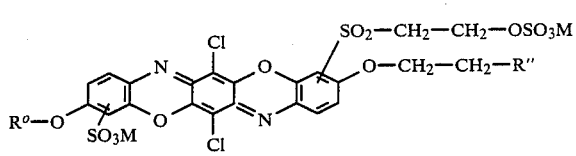

in which M is hydrogen or an alkali metal, R'' is sulfo or sulfato, and $R^o$ is hydrogen, alkyl of 1 to 4 carbon atoms, phenyl, monosulfophenyl or monosulfobenzyl.

14. A compound as claimed in claim 1, in which the group $-NR^1R^2$ is the piperidino, piperazino or morpholino group.

15. A composition consisting essentially of compounds of the formulae (1), (3a) and (3b)

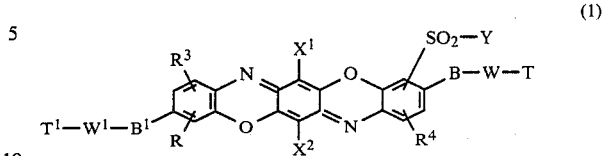

(1)

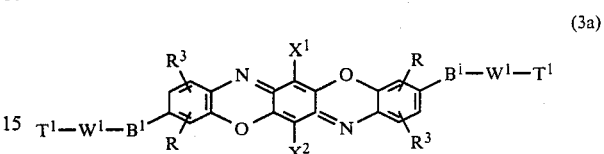

(3a)

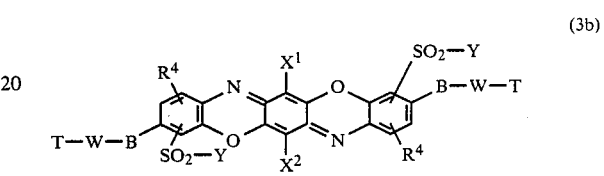

(3b)

in which T, W, B, $T^1$, $W^1$, $B^1$, R, $R^3$, $R^4$, Y, $X^1$ and $X^2$ are defined as in claim 1.

16. A composition as claimed in claim 15 having said compounds in mol-percent ratios of 19 to 50 percent of formula 1, 1 to 25 percent of formula 3a and 80 to 25 percent of formula 3b.

* * * * *

UNITED STATES PATENT AND TRADEMARK OFFICE
CERTIFICATE OF CORRECTION

PATENT NO. : 4,851,527
DATED : July 25, 1989
INVENTOR(S) : Springer et al.

It is certified that error appears in the above-identified patent and that said Letters Patent is hereby corrected as shown below:

Column 32, line 1, please delete "phenylene-alkylene".

Column 33, line 28, "$\beta$-sulfato-dio-" should read --$\beta$-sulfato-di- --.

Signed and Sealed this

Eleventh Day of September, 1990

Attest:

HARRY F. MANBECK, JR.

*Attesting Officer*  *Commissioner of Patents and Trademarks*